(12) United States Patent
Sampaio et al.

(10) Patent No.: US 11,516,005 B2
(45) Date of Patent: Nov. 29, 2022

(54) SYSTEM AND METHOD FOR EXECUTING DATA ACCESS TRANSACTION

(71) Applicant: IMPULSE INNOVATIONS LIMITED, London (GB)

(72) Inventors: Rui Sampaio, London (GB); Andrew Lawrence, London (GB); Marcus Kaiser, London (GB); Maksim Sipos, London (GB); Darko Matovski, London (GB)

( * ) Notice: Subject to any disclaimer, the term of this patent is extended or adjusted under 35 U.S.C. 154(b) by 0 days.

(21) Appl. No.: 17/477,222

(22) Filed: Sep. 16, 2021

(65) Prior Publication Data

US 2022/0094533 A1 Mar. 24, 2022

(30) Foreign Application Priority Data

Sep. 21, 2020 (GB) .................................... 2014843

(51) Int. Cl.
*H04L 9/08* (2006.01)
*H04L 9/00* (2022.01)
*H04L 9/14* (2006.01)

(52) U.S. Cl.
CPC ............ *H04L 9/0825* (2013.01); *H04L 9/008* (2013.01); *H04L 9/14* (2013.01)

(58) Field of Classification Search
CPC .......... H04L 9/0825; H04L 9/008; H04L 9/14
See application file for complete search history.

(56) References Cited

U.S. PATENT DOCUMENTS

2007/0016528 A1* 1/2007 Verhaegh ............ G06F 21/6245
705/50
2017/0048269 A1* 2/2017 York ..................... G06F 21/577
(Continued)

FOREIGN PATENT DOCUMENTS

CN 110704511 A 1/2020
WO 2016161221 A1 10/2016

OTHER PUBLICATIONS

Combined Search and Examination Report under Section 17 and 18(3) issued in GB Application No. GB2014843.3 dated Jun. 10, 2021, 9 pages.

*Primary Examiner* — Meng Li
(74) *Attorney, Agent, or Firm* — RC Trademark Company (57) ABSTRACT

Disclosed is a system for executing a data access transaction. The system comprises a server arrangement, the server arrangement being communicably coupled with at least one requesting device and at least one responding device. The server arrangement is configured to receive from a requesting device and a responding device, a first data and a second data respectively, wherein the first data and the second data are encrypted and temporally defined. Further, the server arrangement receives from the requesting device a metadata of the first data, wherein the metadata is encrypted by the requesting device, determines an encrypted association score by comparing the first data and the second data, wherein the encrypted association score is based on a temporally defined dynamic evaluation component, wherein the temporally defined dynamic evaluation component includes a causality measure, wherein the causality measure is able to identify and exclude spurious correlations between the first data and the second data and provides the encrypted association score to the requesting device and the responding device, wherein each of the requesting device and the responding device partially decrypt the encrypted association score. Further, the server arrangement obtains the partial decryption of the encrypted association score from the responding device and provide the partial decryption to the requesting device, wherein the requesting device fully decrypts the encrypted association score using the partial decryption obtained from the responding device and enables the requesting device to access the second data from the (Continued)

responding device, upon receiving a request for the access to the second data.

19 Claims, 3 Drawing Sheets

(56) References Cited

U.S. PATENT DOCUMENTS

| 2017/0344646 | A1* | 11/2017 | Antonopoulos | G06F 16/2453 |
| 2018/0103302 | A1* | 4/2018 | Bell | H04Q 9/00 |
| 2020/0294056 | A1* | 9/2020 | Patel | G06Q 20/4016 |
| 2021/0126836 | A1* | 4/2021 | Patel | H04L 67/10 |

* cited by examiner

SYSTEM AND METHOD FOR EXECUTING DATA ACCESS TRANSACTION

TECHNICAL FIELD

The present disclosure relates generally to privacy preservation and data communication; and more specifically, to systems and methods for executing a data access transaction.

BACKGROUND

In recent times, the number of digital transactions has increased drastically over the years. With the proliferation of computers and computer networks into all aspects of business and daily life—including finance, energy, health care, logistics, transportation, retail, insurance entertainment, communications—the concern over secure data access and communications privacy is rapidly growing. Digital platforms acting as intermediaries connect two or more market participants via the digital platform (also referred to as a data marketplace) and as a result simplify their interaction (i.e. the data communication). By linking several participants (i.e. the potential buyers and sellers of data) via the digital platform, a more efficient interaction is made possible via implementation of standardized functions, interfaces and services.

Typically, data has different characteristics compared to tangible products that prevent the direct transfer of established processes and rules of trading goods, especially in terms of data privacy and pricing mechanisms. In trading data, there is less willingness to pay by the buyer due to several reasons. For example, data buyers often do not recognize or aren't able to gauge the potential value of the data since the data cannot be fully disclosed prior to purchase (known as the 'Arrow paradox'). Another obstacle is the lack of trust and security causing potential data providers to fear that a third party (such as a competitor) may potentially benefit from disclosure of in-house data and rendering said data worthless.

Data security and privacy is a primary concern when data is communicated over the Internet (or any network). Conventionally, Encryption technology is used to protect data transferred between two computing nodes communicating across a network such as the Internet. The network infrastructure involved in the data communication of a particular set of data may include one or more intermediary network processing nodes that are needed to process different portions of the data in order to correctly route the packets between the two endpoints, as a result the intermediary network processing nodes may be given access to the encryption keys used to encrypt the data. However, decrypting the data (or data packets) at the intermediary points presents a high security risk. For example, an eavesdropper may be able to access the data after being decrypted at the intermediary network processing nodes.

Moreover, the widespread recording and availability of data comes with the promise of radical business optimization. Potential benefits include more efficient resource management, higher productivity, better products, reduced inequality, to name a few. Most of the data is, however, privately owned which constitutes a barrier to realizing this potential. As hinted above, the barrier comes from the fact that potential buyers must first purchase the data in order to make use of it. The buyer has a low level of assurance regarding the quality or relevance of the data before purchasing the data. This barrier deters the interested party from buying data, resulting in a loss for both the sellers and buyers of data. The main hurdle is that the data provider cannot simply reveal the data.

Conventionally, a small sample of the data is provided to the potential buyer, however, it provides little or no pertinent information to the potential buyer. Additionally, a correlation between the potential buyer data and the seller data is measured using existing association computing techniques to determine the relevance and use of the presented data by the potential buyer and potentially answer counterfactual questions, for example, what would have happened if event X had occurred instead of event Y. However, existing computing techniques based on naive correlation association may not provide accurate information regarding the relevance of the seller's data. A common problem is the presence of confounding variables that potentially results in a high correlation score even though the data may be unrelated. Consequently, there is a need for a method or a system to enable potential buyers of data to acquire impartial, quality-scored (or relevant) data sets without revealing the actual data to the buyer, or anyone else such as a third-party, prior to purchase.

Furthermore, a common problem in time-series recording and forecasting is considered, namely that of forward looking bias. Forward looking bias occurs when a data point referring to the past contains information about the future that was not available at the time. For example, the GDP for Q1 is timestamped at January 1st when, if fact, the GDP for Q1 only becomes available at least a month after the end of Q1. Since such bias cannot occur in real-time (information cannot be leaked from the actual future), a system for guarding the potential buyer against such problems is developed.

Therefore, in light of the foregoing discussion, there exists a need to overcome the aforementioned drawbacks associated with conventional systems and methods for executing a data access transaction.

SUMMARY

As the inventors have realised after inventive and insightful reasoning, there are problems, as are discussed briefly above, in that existing systems and methods for execution data access transactions are unable to accurately assess or provide enough information pertinent to the association of a given data without revealing the actual content of the data. Moreover, said systems do not allow the associations to be computed dynamically or in real-time, sometimes rendering the data or computed associations useless. Further, said systems do not tend to the spurious correlations existing between the data sets to compute an accurate association score. Furthermore, said systems do not allow the buyer of data to select the candidate dataset (data of interest) across multiple data sources without explicitly mentioning the required data and, hence disclosing intent. Furthermore, said systems do not allow the buyer of data to select the type of association measure to be employed for computing the association of the data.

The present disclosure seeks to provide a system for executing a data access transaction. The present disclosure seeks to provide a solution to the existing problem of insecure and unreliable data communication by virtue of conventional devices, methods and systems for executing data access transactions. An object of the present disclosure is to overcome or at least mitigate the problems encountered in the prior art and provide an improved system and method for a secure and reliable data communication.

According to one aspect, the object is achieved by providing a system for executing a data access transaction, the system comprising a server arrangement, the server arrangement being communicably coupled with at least one requesting device and at least one responding device, wherein the server arrangement is configured to:
- receive from a requesting device and a responding device, a first data and a second data respectively, wherein the first data and the second data are encrypted and temporally defined;
- receive from the requesting device a metadata of the first data, wherein the metadata is encrypted by the requesting device;
- determine an encrypted association score by comparing the first data and the second data, wherein the encrypted association score is based on a temporally defined dynamic evaluation component, wherein the temporally defined dynamic evaluation component includes a causality measure, wherein the causality measure is able to identify and exclude spurious correlations between the first data and the second data;
- provide the encrypted association score to the requesting device and the responding device, wherein each of the requesting device and the responding device partially decrypt the encrypted association score;
- obtain the partial decryption of the encrypted association score from the responding device and provide the partial decryption to the requesting device, wherein the requesting device fully decrypts the encrypted association score using the partial decryption obtained from the responding device; and
- enable the requesting device to access the second data from the responding device, upon receiving a request for the access to the second data.

Each data access transaction has both a requestor (or buyer) and a responder (or seller), and the requestor and responder are generally different institutions.

Embodiments of the present disclosure enable the system to communicate data in a secure and reliable manner. The system is enabled to determine an accurate, more reliable association of the data without revealing the contents (or raw data). Notably, said association allows the potential buyer to make an informed decision prior to buying the data. Advantageously, the potential buyer does not procure irrelevant and worthless data and consequently waste its resources in the process. Moreover, the system is enabled to compute the association measures dynamically and in real-time, eliminating the problems associated with the fluctuations in the data over time. Further, the system controls the type of association, and the frequency of determination preventing the potential buyer to extrapolate enough information from the data such that the need to buy the data is eliminated.

In one embodiment, the metadata of the first data includes at least one of: time range, date range, prediction horizon, time resolution, background tag, technical tag, type of association measure.

In one embodiment, the server arrangement is further configured to provide a ciphertext to the responding device, wherein the responding device partially decrypts the encrypted association score using the ciphertext.

In one embodiment, the first data and the second data are encrypted using homomorphic encryption.

In one embodiment, wherein the first data and the second data are encrypted using a first public key and a second public key respectively, wherein the requesting device and the responding device provide the first and second public keys to the server arrangement.

In one embodiment, the temporally defined dynamic evaluation component includes a causality measure, wherein the causality measure is able to identify and exclude spurious correlations between the first data and the second data.

In one embodiment, the causality measure is based on an iterative process of conditional independence tests, wherein the conditional independence tests are indicative of whether a subset of the first data is conditionally independent of a subset of the second data, given another subset—the conditioning subset—of either the first data or the second data.

In one embodiment, the conditional independence tests are based on an independence test and at least one of: a regression method, a classification method.

In one embodiment, the regression method of the conditional independence test is based on at least one of: Linear Regression, Generalized Additive Models, Gaussian Processes, Artificial Neural Networks.

In one embodiment, the classification method of the conditional independence test is based on at least one of: Logistic Regression, Generalized Additive Models, Gaussian Processes, Artificial Neural Networks.

In one embodiment, the independence test is determined based on at least one of: Pearson Correlation, Spearman Correlation, Mutual Information, Distance Correlation, Hilbert-Schmidt Independence Criterion, kernel-based independence measures, rank-based independence measures, non-parametric independence measures.

In one embodiment, the conditional independence tests are based on at least one of: Partial Pearson correlation, Partial Spearman Correlation, Conditional Mutual Information, kernel-based conditional independence measures, non-parametric conditional independence measures.

In one embodiment, the causality measure is determined based on Granger Causality.

In one embodiment, the encrypted association score is determined based on at least one of: Pearson Correlation, Spearman Correlation, Kendall Correlation, Mutual Information, Matthews correlation, ANOVA F-value and Point-Biserial correlation.

In one embodiment, the first data received from the requesting device includes a control data for the purpose of guarding against spurious correlations between the first data and the second data.

In one embodiment, the server arrangement is further configured to receive second data from two or more responding devices to provide a cumulative second data, considered for determining the encrypted association score.

According to another aspect, the objective is achieved by providing a method for executing a data access transaction, the method being implemented by a system comprising a server arrangement, the server arrangement being communicably coupled with at least one requesting device and at least one responding device, wherein the method comprises:
- receiving from a requesting device and a responding device, a first data and a second data respectively, wherein the first data and the second data are encrypted and temporally defined;
- receiving from the requesting device a metadata of the first data, wherein the metadata is encrypted by the requesting device;
- determining an encrypted association score by comparing the first data and the second data, wherein the association score is based on a temporally defined dynamic evaluation component, wherein the temporally defined dynamic evaluation component includes a causality measure, wherein the causality measure is able to identify and exclude spurious correlations between the first data and the second data;

providing the encrypted association score to the requesting device and the responding device, wherein each of the requesting device and the responding device partially decrypt the encrypted association score;

obtaining the partial decryption of the encrypted association score from the responding device and provide the partial decryption to the requesting device, wherein the requesting device fully decrypts the encrypted association score using the partial decryption obtained from the responding device; and enabling the requesting device to access the second data from the responding device, upon receiving a request for the access to the second data.

In one embodiment, in the method, the metadata of the first data includes at least one of: time range, date range, prediction horizon, time resolution, background tag, technical tag, type of association measure.

In one embodiment, the method comprises providing a ciphertext to the responding device, wherein the responding device partially decrypts the encrypted association score using the ciphertext.

In one embodiment, in the method, the first data and the second data are encrypted using homomorphic encryption.

In one embodiment, in the method, the first data and the second data are encrypted using a first public key and a second public key respectively, wherein the requesting device and the responding device provide the first and second public keys to the server arrangement.

In one embodiment, in the method, the causality measure is based on an iterative process of conditional independence tests, wherein the conditional independence tests are indicative of whether a subset of the first data is conditionally independent of a subset of the second data, given another subset—the conditioning subset—of either the first data or the second data.

In one embodiment, in the method, the conditional independence tests are based on an independence test and at least one of: a regression method, a classification method.

In one embodiment, in the method, the regression method of the conditional independence test is based on at least one of: Linear Regression, Generalized Additive Models, Gaussian Processes, Artificial Neural Networks.

In one embodiment, in the method, the classification method of the conditional independence test is based on at least one of: Logistic Regression, Generalized Additive Models, Gaussian Processes, Artificial Neural Networks.

In one embodiment, in the method, the independence test is determined based on at least one of: Pearson Correlation, Spearman Correlation, Mutual Information, Distance Correlation, Hilbert-Schmidt Independence Criterion, kernel-based independence measures, rank-based independence measures, non-parametric independence measures.

In one embodiment, in the method, the conditional independence tests are based on at least one of: Partial Pearson correlation, Partial Spearman Correlation, Conditional Mutual Information, kernel-based conditional independence measures, non-parametric conditional independence measures.

In one embodiment, in the method, the causality measure is determined based on Granger Causality.

In one embodiment, in the method, the encrypted association score is determined based on at least one of: Pearson Correlation, Spearman Correlation, Kendall Correlation, Mutual Information, Matthews correlation, ANOVA F-value and Point-Biserial correlation.

In one embodiment, in the method, the causality measure is determined based on Granger Causality.

In one embodiment, in the method, the first data received from the requesting device includes a control data indicative of spurious correlations between the first data and the second data.

In one embodiment, in the method, the server arrangement is further configured to receive second data from two or more responding devices to provide a cumulative second data, considered for determining the encrypted association score against the first data.

According to yet another aspect, the objective is achieved by providing a computer program product comprising a non-transitory computer-readable storage medium having computer-readable instructions stored thereon, the computer-readable instructions being executable by a computerized device comprising data processing hardware to execute a method for executing a data access transaction.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following drawings wherein.

DETAILED DESCRIPTION

The following detailed description illustrates embodiments of the present application and ways in which they can be implemented. Although some modes of carrying out the present teachings have been disclosed, those skilled in the art would recognize that other embodiments for carrying out or practising the present teachings are also possible.

Figure 1:
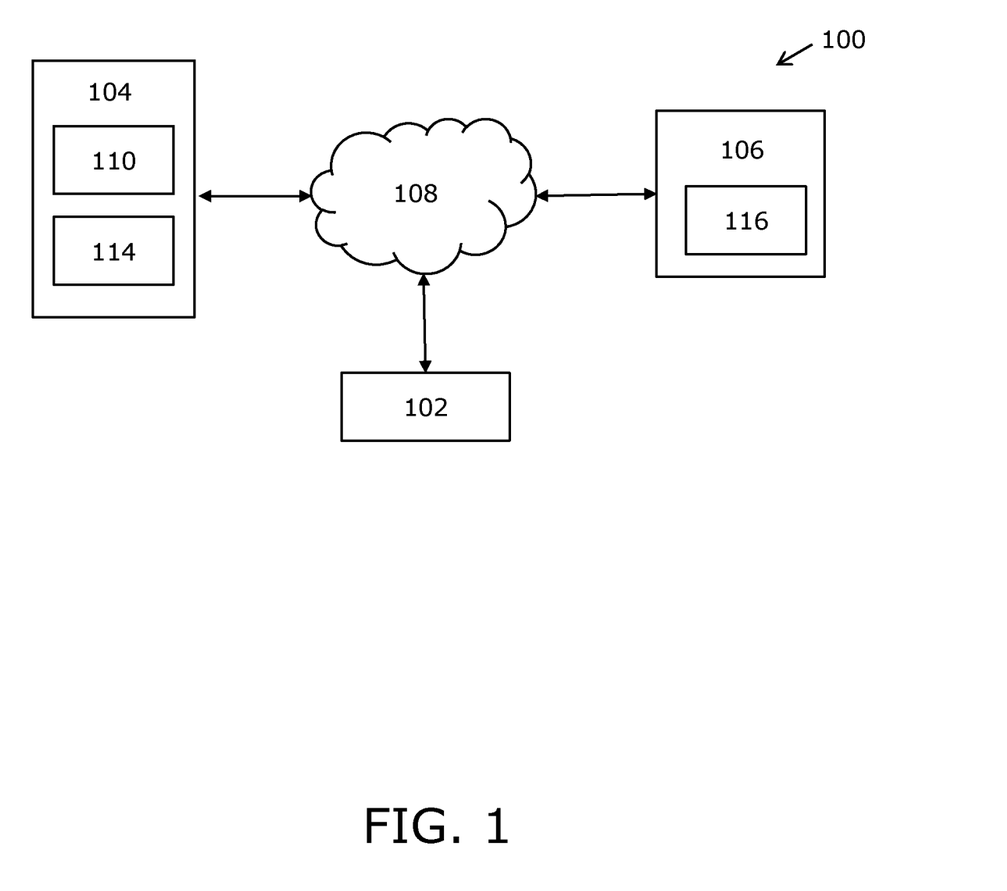
FIG. 1 illustrates a block diagram of a system for executing a data access transaction, in according with the embodiments of the present disclosure.

FIG. 1 illustrates a block diagram of a system 100 for executing a data access transaction, in accordance with an embodiment of the present disclosure. The system 100 comprises a server arrangement 102, at least one requesting device, such as a requesting device 104, and at least one responding device, such as a responding device 106. The server arrangement 102 being communicably coupled with the requesting device 104 and the responding device 106 using a communication network 108.

The server arrangement 102 includes at least a server configured to control the execution of the data access transaction. The term "data access transaction" refers to a unit of work performed within a system (such as the system 100) against any data and treated in a coherent and reliable way independent of other transactions. A transaction generally represents any change in the data or data sets. Herein, the data access transaction refers to a transaction of the requesting device 104 for seeking access to the data from the responding device 106 via the server arrangement 102 acting as an intermediary between the two devices (i.e. the requesting device 104 and the responding device 106). The term "server arrangement" refers to a structure and/or module that include programmable and/or non-programmable components configured to store, process and/or share information related to the one or more transactions. Optionally, the server arrangement 102 includes any arrangement of physical or virtual computational entities capable of enhancing information to perform various computational tasks. Furthermore, it will be appreciated that the server arrangement 102 may be implemented as a hardware server and/or plurality of hardware servers operating in a parallel or in a distributed architecture. Optionally, the servers in the server arrangement 102 are supplemented with additional computation methods, such as neural networks, and hierarchical clusters of pseudo-analog variable state machines implementing artificial intelligence algorithms. In an example, the server arrangement 102 may include components such as a memory, a processor, a data communication interface, a network adapter and the like, to store, process and/or share information with other computing devices, such as the requesting device 104 and the responding device 106. Optionally, the server arrangement 102 is implemented as a computer program that provides various services (such as database service) to other devices, modules or apparatus. Moreover, the server arrangement 102 refers to a computational element that is operable to respond to and processes instructions to perform the data access transactions. Optionally, the server arrangement 102 includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit, for example as aforementioned. Additionally, the server arrangement 102 is arranged in various architectures for responding to and processing the instructions for executing the data access transaction in the system 100.

The term "requesting device" refers to any computation device configured to transmit a request to another computation device, such as seeking access to data from another computation device such as the responding device 106. The requesting device 104 comprises a memory for storing data and a data communication interface for communicating data to the server arrangement 102. Moreover, the requesting device 104 comprises software modules, namely an encryption module for encrypting data prior to transmission and a decryption module for decrypting data (for example, an encrypted association score). Herein, the server arrangement 102 is configured to support a network such as the communication network 108 composed of two or more interacting devices (such as the requesting device 104 and the responding device 106), wherein the two or more interacting devices communicate via the inherent data communication interface. Examples of requesting device 104 includes, but is not limited to, desktop computer, portable computer or laptop, mainframe computer, supercomputer, mobile phones and/or smart phones, smart watches, smart glasses, tablet computers, personal digital/data assistants (PDA), hand-held devices, network appliances, Internet appliances, wearable embedded devices, and the like. Optionally, the system 100 comprises different types of requesting devices (e.g. thin clients, zero clients, thick clients), as detailed by factors such as onboard storage and task relevance.

The term "responding device" refers to any computation device configured to respond to any computation device (for example, the requesting device 104), i.e. responding to a request to access data, received from another computation device. The responding device 106 comprises a memory for storing data and a data communication interface for communicating data to the server arrangement 102. Moreover, the responding device 106 comprises software modules, namely an encryption module for encrypting data prior to transmission or communication of the data and a decryption module for decrypting data (such as the encrypted association score). Examples of responding device 106 includes, but is not limited to, desktop computer, portable computer or laptop, mainframe computer, supercomputer, mobile phones and/or smart phones, smart watches, smart glasses, tablet computers, personal digital/data assistants (PDA), hand-held devices, network appliances, Internet appliances, wearable embedded devices, and the like. Optionally, the system 100 comprises different types of computation devices (e.g. thin clients, zero clients, thick clients), as detailed by factors such as onboard storage, task relevance.

Moreover, the at least one requesting device (such as the requesting device 104) and the at least one responding device (such as the responding device 106) is beneficially communicably coupled to each other via a data communication network 108. The data communication network 108 allows for communication among the interacting computation devices (such as the requesting device 104, the responding device 106). In other words, each of the at least one requesting device and the at least responding device is capable of communicating with other computation devices (such as the server arrangement 102) via the data communication network 108. Notably, the data communication network 108 relates to an arrangement of interconnected, programmable and/or non-programmable components that, when in operation, facilitate data communication between one or more computation devices and/or databases. Furthermore, the data communication network 108 includes, but is not limited to, a peer-to-peer (P2P) network, ring communication networks, a hybrid peer-to-peer network, local area networks (LANs), radio access networks (RANs), metropolitan area networks (MANs), wide area networks (WANs), all of or a portion of a public network such as global computer network known as the Internet®, a private network, a cellular network and any other communication system. Additionally, optionally, the data communication network 108 employs wired or wireless communication that can be carried out via one or more known protocols, including, but not limited to, Internet Protocol (IP), Wireless Access Protocol (WAP), Frame Relay, or Asynchronous Transfer Mode (ATM), Bluetooth® an such like. Moreover, any other suitable protocols using voice, video, data, or combinations thereof, can also be employed, for example VoIP.

The server arrangement 102 is configured to receive from the requesting device 104 and the responding device 106, a first data 114 and a second data 116 respectively, wherein the first data 114 and the second data 116 are encrypted and temporally defined. The first data 114 and the second data 116 as referred to herein the present disclosure refers to the data received by the server arrangement 102 from the requesting device 104 and the responding device 106 respectively. Notably, the first data 114 and the second data 116 refers to a time series data. The term "time series" refers to a dataset or a series of data points indexed (or listed or graphed) in a temporal order. The time series is a sequence taken at successively spaced points in time. In other words, a sequence of discrete-time data. Optionally, the points in time are spaced at equal intervals. Optionally, the points in time are spaced at varying intervals. Generally, the time series data includes large volumes of data having a high dimensionality, wherein the data in the time series is added and analyzed dynamically as time progresses. Moreover, the time series is updated in real time, specifically at the successively spaced points in time. The first data 114 and the second data 116 are encrypted by the requesting device 104 and the responding device 106 respectively, prior to transmitting the respective data over the communication network 108 to the server arrangement 102. Notably, for encrypting the data, the requesting device 104 generates a pair of first keys, a first secret decryption key (sk1) and a first public encryption key (pk1). Similarly, the responding device 106 generates a pair of second keys, a second secret decryption key (sk2) and a second public encryption key (pk1). The requesting device 104 and the responding device 106 transmit the first data 114 and the second data 116 respectively to the server arrangement 102 along with their respective public encryption keys i.e. the first public encryption key with the first data 114 and the second public encryption key with the second data 116. The public encryption keys are employed by the server arrangement 102 to perform computations and/or operations on the received data without the need of decrypting each of the data 114, 116. Moreover, the first data 114 and the second data 116 are temporally defined. The term "temporally defined" refers to the ordering of data based on a pre-defined standard with respect to time. It is appreciated that each of the first data 114 and the second data 116 are aligned with respect to each other based on a pre-defined standard. In an example, each data point of the first data 114 and the second data 116 is associated with a timestamp. Specifically, the first data 114 and the second data 116 comprises a start date, an end date, and the data frequency to allow both the requesting device 104 and the responding device 106 to provide the corresponding aligned data (i.e. the first data 114, the second data 116). The first data 114 and the second data 116 are encrypted. The term "encrypted" refers to conversion of information or data into a code, especially to prevent unauthorized access. In other words, encryption is a method for any computation device such as the requesting device 104 or the responding device 106 and the server arrangement 102 to securely share data over an insecure network or storage site. Typically, the first data 114 and the second data 116 are encrypted such that the interacting computation devices are unable to view or learn the raw data of the first data 114 or the second data 116 without access to the respective private keys (i.e. the first private key 114 and the second private key for the second data 116). Moreover, encryption also allows the data to be transferred safely without the risk of exposure via an unwanted party or an eavesdropper during data communication.

In an embodiment, the first data 114 and the second data 116 are encrypted using a first public key (such as the first public key pk1) and a second public key (such as the second public key pk2) respectively, wherein the requesting device 104 and the responding device 116 provide the first and second public keys to the server arrangement 102.

In an embodiment, the first data 114 and the second data 116 are encrypted using homomorphic encryption. Typically, Homomorphic encryption allows for computation on encrypted data (such as the first data 114 and the second data 116) without the necessity of decrypting the original raw data. Upon encryption under a homomorphic encryption scheme, any computation device (such as the requesting device 104 or the responding device 106) having access to the public key (such as the first public key for the first data 114 or the second public key for the second data 116) is able to perform or evaluate functions such as the association score on the underlying data (i.e. the raw data) without the need to perform decryption. The association score of the encrypted data is determined by employing an evaluation algorithm or component suitable for implementation under a homomorphic encryption scheme, and therefore allowing the outsourcing of data processing without the need to reveal the raw data.

Optionally, the encryption scheme employed for encrypting the first data 114 and the second data 116 includes a public-key encryption (PKE) scheme. In case of a public-key encryption scheme, for enabling the two parties, such as the requesting device 104 and the responding device 106, to communicate securely over an insecure or secure channel such as the communication network 108. The public-key encryption scheme comprises of four probabilistic polynomial time (PPT) algorithms, namely Setup, key generation (KeyGen), encryption (Enc) and decryption (Dec). The setup algorithm takes as an input, the security parameter ($1n$), and returns a set of public parameters (pp), available as an input to all other algorithms. Further, the Key Generation algorithm provides an output as a pair of keys, a secret decryption key (sk) and a public encryption key (pk). Furthermore, the encryption algorithm (via the encryption module) encrypts the data such as the first data 114 and the second data 116 and provides an output as a ciphertext (ct). Furthermore, the decryption algorithm (via the decryption module) employs the secret key on the provided ciphertext and, provides an output as the raw data.

The server arrangement 102 is configured to receive from the requesting device 104 a metadata 110 of the first data, wherein the metadata 110 is encrypted by the requesting device 104. The term "metadata" refers to a set of data that describes and gives information about other data, specifically the first data 114 or the second data 116. The metadata 110 is transmitted by the requesting device 104 to the server arrangement 102 under encryption. The encrypted metadata 110 of the first data 114 is potentially decrypted by the intermediary (i.e. the server arrangement 102). In other words, the metadata 110 is separate from the homomorphically encrypted data which is never fully decrypted. The metadata 110 of the first data 114 is configured to provide information relating to the first data 114 to the server arrangement 102, as a result, enables the server arrangement 102 to propose multiple transformations for the second data 116. Further optionally, the server arrangement 102 provides multiple transformations for the first data 114. Typically, the provided multiple transformations are controlled by the requesting device 104 by providing the metadata 110 of the first data 114 to the server arrangement 102. For example, the user or the requesting device 104 might require all level-like data, such as the price of a stock, to be differentiated by N-steps. Similarly, the buyer or the requesting device 104 may select the transformations of the multiple transformations to consider, for example, only 1-step returns and up to 30 days moving averages shall be considered. Alternatively, if no transformations are specified, the server arrangement 102 autonomously proposes a set of transformations that are relevant for the type of data. Additionally, the metadata 110 of the first data 114 provides information relating to the time series operations configured to pre-process the raw data of the first data 114 and the second data 116 to better or accurately measure the association between the two data. In other words, the metadata 110 is provided additionally prior to determining the encrypted association score being determined for each of the first data 114 and the second data 116. Additionally, the encrypted association score is determined for each of the transformations of the data (such as the first data 114 and the second data 116). Typically, the transformations include, but are not limited to, moving averages, lags, differences and returns. Notably, the aforementioned transformations are supported by the homomorphic encryption. Notably, any transformation compatible with homomorphic encryption can be used.

In an embodiment, the metadata 110 of the first data 114 includes at least one of time range, date range, prediction horizon, time resolution, background tag, technical tag, type of association measure. The time range of the first data 114 includes at least a start time and an end time. Notably, the time range of the first data 114 also includes a start date along with the start time and an end date along with the end time. For example, the start date and the start time to evaluate the association measure is represented as 01/01/2015 00:00:00, and the end date and the end time to evaluate the association measure is represented as 31/12/2019 23:59:59. The rolling window size is included to evaluate the association measure dynamically (i.e. on a rolling window). For example, a rolling window size may be specified by the requesting device 104 for daily data, to evaluate on the preceding 365 days such as from January-2015 to January-2016. The prediction horizon, specified by the requesting device 104 (or the user), refers to the time horizon over which a prediction is potentially made. Notably, time-series causality comprises determination of whether the current or past values of a time series (or data) are one of the possible causes of current or future values of another time series. Optionally, the determination of said cause comprises the determination of whether the current or past values of a time series (or data) aid, or help, in predicting future values of another time series. On account of a specified resolution (such as daily, weekly, monthly, yearly etc.) of the data (such as the first data 114 or the second data 116) the first data 114 and the second data 116 may have different resolutions. Further, the specified resolution may or may not be different from the prediction horizon resolution. For example, the requesting device 104 requests the server arrangement 102 to compare weekly data against daily data from a responding device 106 in order to predict information in the future (such as one month ahead). The time resolution is implemented to properly align the two or more data (such as the first data 114 and the second data 116). Further, the time resolution is implemented to better match or fine tune the search query. For example, if the requesting device 104 is interested in daily/intra-day data for 1-day-ahead predictions, annual data will be disregarded on the account of its unlikely relevance for daily/intra-day predictions. Moreover, the background tag refers to set of tags configured to characterize the data (such as the first data 114 or the second data 116) to better tune the search, such as, the relevant industry. Additionally, technical tags are specified by the requesting device 104. In an example, whether the data (such as the first data 114 or the second data 116) must be stationary or not. In another example, whether the data should be return-like or level-like. In yet another example, level-like data is typically characterized for having a (constant or time-dependent) trend in time such as the price of a stock. Return-like time-series typically arise from taking ratios or differences of level-like time-series, such as the 1-day return of a stock price, which is typically characterized by a distribution with mean close to zero, with no particular trends in time and potentially stationary. Furthermore, the type of association measure is specified by the requesting device 104 to indicate the type of association measure to consider or implement. Typically, a trade-off is considered. For example, simple correlations are computationally inexpensive but prone to high false positive rates of discovery. Thus, the requesting device 104 may initially implement a fast search on a large set of time-series based on a simple correlation method as a first-selection step, follow by a more computationally expensive causality search on a smaller set of time-series.

The server arrangement 102 is configured to determine an encrypted association score of the first data and the second data by comparing the first data 114 and the second data 116. The association score refers to a type of function, an algorithm or a test, whose output scores the magnitude of a particular type of association between two data sets such as the first data 104 and the second data 106. The term "association" refers to the multivariate analysis employed to determine the strength of association between two or more variables or time series (such as the first data 114 and the second data 116) and potentially the direction of said relationship. The term "correlation" refers to a particular type of association, for example a linear relationship or association between two variables. Further, in terms of the strength of the relationship, the value of the association can be bounded, for example, between +1 and −1, or unbounded, for example, exceeding the bounded range. A threshold or range of values can be specified by the buyer or requesting device as to determine whether the time-series or dataset is relevant. In one example, a bounded association score of ±1 indicates a perfect degree of association between the two variables. As the association value goes towards 0, the relationship between the two variables will be weaker. In another example, an unbounded positive association score larger than 1 indicates a strong association. It will be appreciated that the association score may also be referred to as an association measure or association value throughout the present disclosure. The encrypted association score is based on a temporally defined dynamic evaluation component. Typically, the temporally defined dynamic evaluation component is employed by the server arrangement 102 to determine or compute the encrypted association score between the first data 114 and the second data 116. The server arrangement 102 autonomously aligns the data (such as the first data 114) with respect to another data (such as the second data 116) in order to determine the association score using the temporally defined dynamic evaluation component. The temporally defined dynamic evaluation component is configured for time-series representing dynamic systems (for example, the stock market) and hence the encrypted association score is determined on a rolling window based on the temporally defined dynamic evaluation component. Notably, the strength of the association between the two time-series can change with respect to time and beneficially the temporally defined dynamic evaluation component provides the dynamic calculation capability to the system 100. In an example, a user (such as the requesting device 104) is interested in the stability of the association (or the association score) over the past and its comparison with the present. Consequently, an association score (such as the encrypted association score) is calculated for each window and aggregated into a final association score (for example, via averaging individual association scores), or instead the association score for each window is returned to the user at upon potentially receiving a request from the requesting device 104.

The temporally defined dynamic evaluation component includes a causality measure, wherein the causality measure is able to identify and exclude spurious correlations between first data 114 and the second data 116. The term "causality" in a statistical sense refers to a type of dependence, wherein the direction of flow is inferred as a result of the knowledge of temporal structure (i.e. temporally defined) and the notion that the cause has to precede the effect. The "causality measure" refers to a function or a test or an algorithm to determine or quantify the extent, wherein one state, event or process (referred collectively as a variable) influences, or is one of the causes of, another variable. In an example, if a first variable is one of the causes of the second variable, in such a case, the second variable is referred to as the effect, or one of the effects, of the first variable. Notably, the causality measures are asymmetric and indicative of which variable is the cause and which variable is the effect. Herein, the causality measure is employed to identify and exclude spurious correlations between the first data 114 and the second data 116. The term "spurious correlation" refers to a correlation between two variables that are not linked by cause and effect. In other words, neither of the variables is a cause or effect of the other. Typically, the spurious correlations between two variables are the result of a third variable, commonly referred to as the confounding variable, that acts as a common cause of the two variables. Moreover, determining naïve correlations between the first data 114 and second data 116 is not sufficient, since these determined correlations often present spurious correlations (or meaningless correlations that happen by chance) typically caused by confounding variables. Beneficially, the causality measure identifies, assesses and ultimately excludes the spurious correlations to further effectively determine the encrypted association score.

In an embodiment, the causality measure is determined by a sequence of conditional independence tests, wherein the conditional independence tests are indicative of whether a subset Y of the first data is conditionally independent of a subset X of the second data given another subset Z—disjoint of X and Y—of either the first data or the second data. In other words, two random events X and Y are conditionally independent, given a third event Z, precisely if the occurrence of X and the occurrence of Y are independent events in their conditional probability distribution. Alternatively stated, X and Y are conditionally independent given Z, if and only if, provided knowledge that Z occurs, then the knowledge of whether X occurs provides no information on the likelihood of Y occurring, and vice versa. Notably, the concept of conditional independence can be extended from random events to random variables and random vectors. Further, if the outcome of the conditional independence test is a negative result, then Y is said to be conditionally independent of X. Moreover, the term "negative result" refers to, in the statistical sense, to indicate that the null hypothesis of the test was not disproven. Mathematically, it is not disproven that $p(X,Y|Z)=p(X|Z)*p(Y|Z)$, where $p(X,Y|Z)$ is the joint probability of X and Y, given Z, $p(X|Z)$ is the probability of X given Z and $p(Y|Z)$ is the probability of Y given Z. Notably, in a statistical sense, if Y is conditionally independent of X, X is ruled out as containing one or more causes of Y.

In an example, the conditional independence test comprises of a regression method and an independence test, wherein the independence test, in the statistical sense, is indicative of whether two variables are independent or not. In another example, using the regression method, X is regressed on Z yielding a mathematical function $f_X(Z)$ and Y is regressed on Z, yielding a mathematical function $f_Y(Z)$. Further, the independence test is subsequently applied to the residuals of each regression, that is, the independence test is applied to the sets $R_X=X-f_X(Z)$ and $R_Y=Y-f_Y=Y-f_Y(Z)$, respectively. If, in the statistical sense, the result of the independence test is negative, Y is said to be conditionally independent of X, given Z. Collectively, this iterative process presents one example of a conditional independence test.

In an embodiment, the regression method of a conditional independence test is based on at least one of: Linear Regression, Generalized Additive Models, Gaussian Processes, Artificial Neural Networks.

In an embodiment, the classification method of the conditional independence test is based on at least one of: Logistic Regression, Generalized Additive Models, Gaussian Processes, Artificial Neural Networks.

In an embodiment, the independence test is determined based on at least one of: Pearson Correlation, Spearman Correlation, Mutual Information, Distance Correlation, Hilbert-Schmidt Independence Criterion, kernel-based independence measures, rank-based independence measures, non-parametric independence measures. The type of independence test to be implemented is based on the efficiency of at least one of: implementation, resource availability and/or user preference. It will be appreciated by a person skilled in the art that other types of independence tests may be used without limiting the scope of the disclosure.

In an embodiment, the conditional independence tests are based on at least one of: Partial Pearson Correlation, Partial Spearman Correlation, Conditional Mutual Information, kernel-based conditional independence measures, non-parametric conditional independence measures. For example, the "Partial Spearman Correlation" refers to the above given example of the conditional independence test, wherein the regression method is based on Ordinary Least Squares method and the independence test is based on Spearman Correlation. For example, the "Partial Pearson Correlation" refers to the above given example of the conditional independence test, wherein the regression method is based on the Ordinary Least Squares method and the independence test is based on Pearson Correlation.

In an embodiment, the temporally defined dynamic evaluation component including the causality measure is determined based on Granger Causality. The Granger Causality is a statistical concept of causality that is based on prediction. According to Granger causality, if a time series $X_1$ (such as the second data 116) "Granger-causes" (or "G-causes") a time series $X_2$ (such as the first data 114), then the past values of the time series $X_1$ should contain information that helps predict the time series $X_2$ above and beyond the information contained in past values of time series $X_2$. The original mathematical formulation of the Granger Causality is based on linear regression modeling of stochastic processes. In an exemplary scenario, a potential buyer (such as the requesting device 104) of data (such as the second data 116) is interested in predicting a time-series of interest $Y_t$ (such as the first data 114). The buyer or the requesting device 104 assesses the relevance of a second time-series (i.e. the second data 116) $X_t$ of a data provider (such as the responding device 106). Assuming a true data generation process of the form:

$$Y_t+1=aY_t+EY_t+1 \text{ (the first data 114), and}$$

$$X_t=bY_t+EX_t \text{ (the second data 116);}$$

wherein a and b are constants greater than zero and $EY_{t+1}$ and $EX_t$ describe (unobserved) random effects that are not captured by either of the variables X or Y. Further assuming, $EY_{t+1}$ and $EX_t$ are uncorrelated and normally distributed. It is observed that the current value of X (such as of the second data 116) does not provide any new information while predicting Y (such as the first data 114). However, a naive correlation calculation between the current values of X and the next (future) value of Y would present a positive correlation between the first data 114 and the second data 116 due to the presence of previously mentioned spurious correlations (in this case, due to confounding variable $Y_t$) between the first data 114 and the second data 116. Consequently, misleading the potential buyer (such as the requesting device 104) to eventually purchase the second data 116. Beneficially, the temporally defined dynamic evaluation component including the causality measure, specifically implementing Granger Causality, determines and excludes the spurious correlations to effectively and accurately determines a reliable association score. Optionally, other causality-based association measures can be used.

In an embodiment, the encrypted association score is determined based on at least one of: Pearson Correlation, Spearman Correlation, Kendall Correlation, Mutual Information, Matthews correlation, ANOVA F-value and Point-Biserial correlation. Typically, the encrypted association score measures the degree of association between the two data sets (such as the first data 104, the second data 106) or time-series (technically, random variables). Specifically, the Pearson correlation assesses or tests for linearity between the two data sets (such as the first data 104, the second data 106), whereas the Spearman correlation assesses or tests for monotonicity between the two data sets (such as the first data 104, the second data 106). Further, the encrypted association score may be determined employing Mutual Information that assesses or tests how much additional information can be gained about one time-series (such as the first data 114) by observing another time-series (such as the second data 116). Moreover, the type of association measure to be implemented to compute the encrypted association score depends upon the efficiency of implementation, resource availability and/or user preference. It will be appreciated by a person skilled in the art that other types of association measures or correlation measures may be used without limiting the scope of the disclosure. Optionally, other association measures are employed to determine the association such as, but not limited to, a Kendall rank correlation to assess via a non-parametric test to determine the strength of dependence between the two data sets (such as the first data 104, the second data 106), Matthews correlation as a measure of the quality of binary (two-class) classifications, especially if the two classes are of different sizes, ANOVA F-value to determine whether the variability between two or more group means is larger than the variability of the observations within the two or more groups and the Point-Biserial correlation to determine the strength and direction of the association existing between two different data sets, wherein the data sets include at least a continuous variable or a dichotomous variable.

The server arrangement 102 is configured to provide the encrypted association score to the requesting device 104 and the responding device 106. The encrypted association score is provided in order to partially decrypt the association score. Each of the requesting device 104 and the responding device 106 partially decrypt the encrypted association score at their respective ends, to analyze the information pertaining the encrypted association score. Optionally, the responding device 106 retrieves a ciphertext from the server arrangement 102 and produces a partial decryption of the resulting encrypted association score. Notably, the responding device 106 does not learn any new information about the encrypted association score from the partial decryption. Upon completing the partial decryption, the partial decryption from the responding device 106 is sent to the requesting device 104 via the server arrangement 102. Upon receiving the partial decryption from the server arrangement 102, the requesting device 104 completes the decryption (or fully decrypts) using their secret key (sk1) and the public key (pk2). Notably, throughout the process, only the requesting device 104 learns the resulting association score (or scores). Additionally, optionally, if any of the association score measured by the server arrangement 102 are particularly high (or above a pre-defined threshold), the requesting device 104 transmits an alert to the server arrangement 102 to initiate a potential data transaction with the responding device 106.

In an embodiment, the server arrangement 102 is configured to provide a ciphertext to the responding device 106. In other words, the responding device 106 is configured to receive a ciphertext from the server arrangement 102. Upon receiving the ciphertext from the server arrangement 102, the responding device 106 partially decrypts the encrypted association score to produce the partial decryption of the resulting encrypted association score. Notably, the responding device 106 does not learn any information regarding the encrypted association score from the partial decryption. Beneficially, the partial decryption is done by the responding device 106 in an effort to aid the requesting device 10 to make an informed decision regarding the second data 116 i.e. the data being requested.

The server arrangement 102 is configured to obtain the partial decryption of the encrypted association score from the responding device 106. The partial decryption is transmitted by the responding device 106 to the requesting device 104 via the server arrangement 102. Upon receiving the partial decryption from the server arrangement 102, the requesting device 104 is configured to fully decrypt the encrypted association score. In other words, the requesting device 104 performs a complete or full decryption of the encrypted association score using their secret key (such as the first secret key) and the obtained partial decryption from the responding device 106. Typically, only the requesting device 104 learns the resulting association score.

The server arrangement 102 is configured to enable the requesting device 104 to access the second data 116 from the responding device 106. The access to the second data 116 is granted by the responding device 106 or the server arrangement 102 upon receiving a request from the requesting device 104. The term "request" refers to a request for a data access transaction to seek access from the responding device 106 regarding the second data 116. For example, if the encrypted association score is high or above a pre-defined or pre-specified threshold, the requesting device 104 alerts the server arrangement to initiate a potential data access transaction with the responding device 106. In another example, considering an arbitrary number of interacting computation devices, allowing us to build a protocol with k participating parties. The data (such as the first data 114) of the requesting device 104 is measured or compared against multiple data i.e. second data from two or more responding devices (similar to the responding device 106) and allows for maximal opportunity for data access transactions, whilst retaining data confidentiality.

In an embodiment, the server arrangement 102 is further configured to receive second data from two or more responding devices (similar to the responding device 106) to provide a cumulative second data, considered for determining the encrypted association score. Each of the second data (i.e. the candidate time-series) is aggregated or cumulated into a cumulative second data, depending on the conditions (such as the seller policy) presented by the responding device 106. In an example, the seller (or the responding device 106) does not want the second data 116 to be tested jointly with other sellers (i.e. the two or more responding devices). The difference being, that the two or more responding devices might have data (such as second data) that is not predictive of the target time-series (i.e. the first data 114) when considered singularly, but the interaction of the second data 116 of the responding device 106 with second data of the two or more responding devices may produce a new time-series (such as the cumulative second data) that is predictive. Additionally, optionally, the association measure or the association score is revealed to all interacting computation devices such as the at least one requesting device (such as the requesting device 104) and the at least one responding device (such as the responding device 106). Further optionally, the system 100 is configured to adapt said process (i.e. revealing the encrypted association score) in a manner such that that all interacting computation devices such as the at least one requesting device, the at least one responding device, and the server arrangement 102 are able to view the resulting association score.

In an embodiment, the responding device 106 transmits one or more data (such as the second data 116) to the server arrangement 102. Typically, in such a scenario, the first data 114 received from the requesting device 104 may include a control data for the purpose of guarding against spurious correlations between the first data 114 and the second data 116. The control data is configured to identify, assess and exclude spurious correlations or time-series that do not provide any additional information compared to the control data. Optionally, the control data (or control time-series) may be the same time-series that is being forecasted. In an example, the control data or the control time-series is akin to a control group in a clinical trial, where the objective is to account for uncontrolled/unmeasured effects/properties not directly related to the drug.

Figure 2:
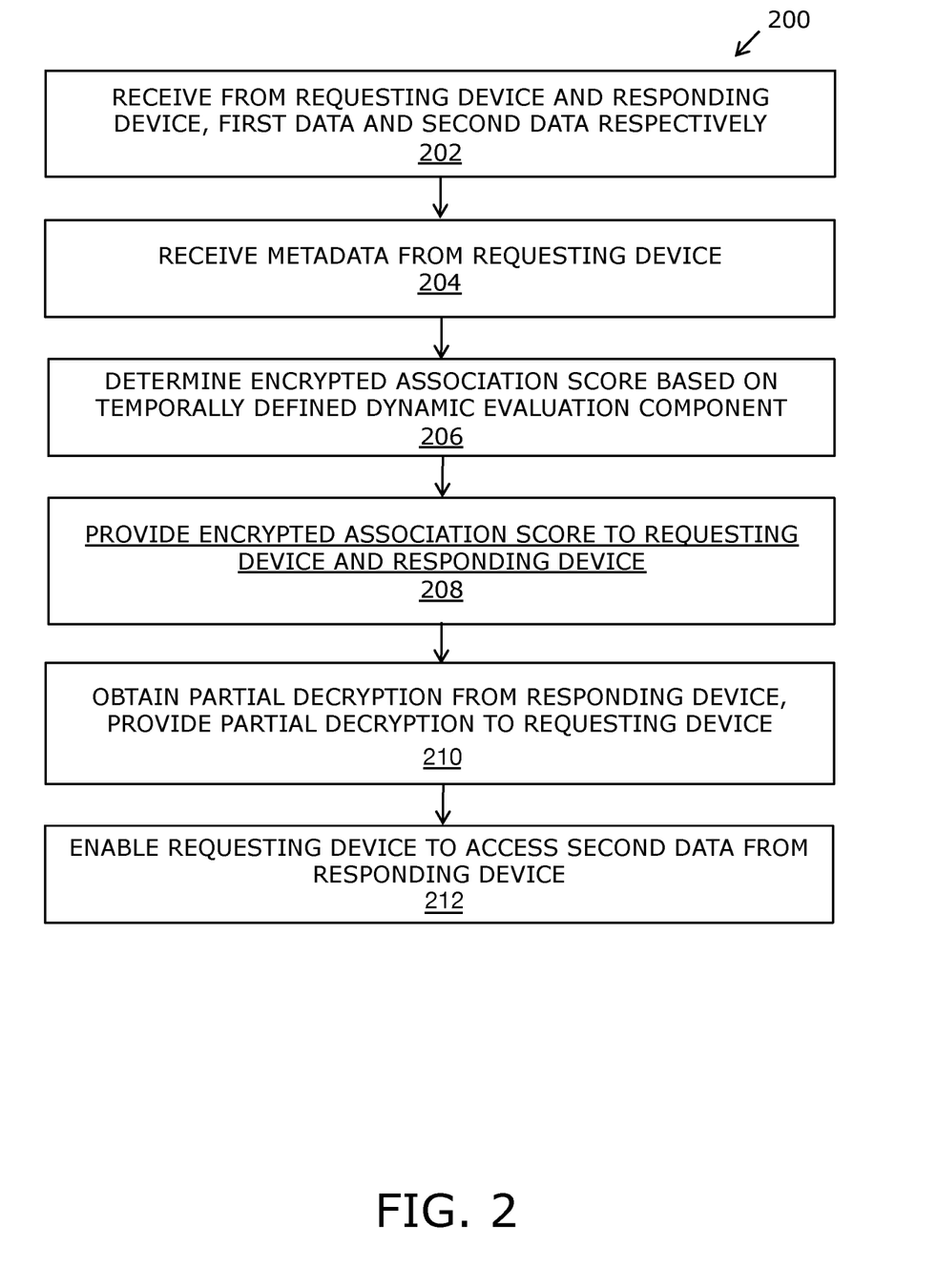
FIG. 2 illustrates a flowchart of a method for a system for executing a data access transaction, in accordance with the embodiments of the present disclosure.

Referring now to FIG. 2, illustrated is a flowchart of a method 200 for a system 100 for executing a data access transaction, in accordance with an embodiment of the present disclosure. The FIG. 2 should be read in conjunction with FIG. 1. For example, the method 200 is executable by the server arrangement 102 of the system 100 which is shown and explained in conjunction with FIG. 1. The server arrangement 102 being communicably coupled with at least one requesting device, such as the requesting device 104 and at least one responding device, such as the responding device 106. As shown, the method 200 for the system 100, includes steps 202-212.

At step 202, the method 200 comprises receiving from a requesting device (such as the requesting device 104 of FIG. 1) and a responding device (such as the responding device 106 of FIG. 1), a first data (such as the first data 114 of FIG. 1) and a second data (such as the second data 116 of FIG. 1) respectively, wherein the first data 114 and the second data 116 are encrypted and temporally defined. Typically, the first data 114 and the second data 116 are encrypted by their respective computation devices (such as the requesting device 104, the responding device 106 of FIG. 1) and transmitted to the server arrangement 102.

At step 204, the method 200 comprises receiving from the requesting device 104 a metadata 110 of the first data 114, wherein the metadata 110 is encrypted by the requesting device 104. Typically, the metadata 110 of the first data 114 is received by the server arrangement 102 for aligning the first data 114 and second data 116 respectively.

At step 206, the method 200 comprises determining an encrypted association score by comparing the first data 114 and the second data 116, wherein the association score is based on a temporally defined dynamic evaluation component, wherein the temporally defined dynamic evaluation component includes a causality measure, wherein the causality measure is able to identify and exclude spurious correlations between the first data and the second data. The server arrangement 102 compares the first data 114 and the second data 116 to determine the encrypted association score based on the temporally defined dynamic evaluation component.

At step 208, the method 200 comprises providing the encrypted association score to the requesting device 104 and the responding device 106, wherein each of the requesting device 104 and the responding device 106 partially decrypt the encrypted association score. Upon determining the encrypted association score, the server arrangement 102 provides the encrypted association score to each of the requesting device 104 and the responding device 106.

At step 210, the method 200 comprises obtaining the partial decryption of the encrypted association score from the responding device 106 and providing the partial decryption to the requesting device 104 via the server arrangement 102, wherein the requesting device 104 fully decrypts the encrypted association score using the partial decryption obtained from the responding device 106. Typically, the server arrangement 102 obtains the partial decryption of the encrypted association score from the responding device 106 and provides it to the requesting device 104 for further decryption (complete decryption) of the encrypted association score.

At step 212, the method 200 comprises enabling the requesting device 104 to access the second data 116 from the responding device 106, upon receiving a request for the access to the second data 116. The server arrangement 102 enables the requesting device 104 to access the second data 116 upon receiving the request for access to the second data 116 from the requesting device 104.

The present disclosure also relates to the method 200 as described above. The various embodiments and variants disclosed above apply mutatis mutandis to the method 200.

Optionally, the method 200 comprising the metadata 110 of the first data 114 comprises at least one of: time range, date range, prediction horizon, time resolution, background tag, technical tag, type of association measure.

Optionally, the method 200 comprises providing a ciphertext to the responding device 106, wherein the responding device 106 partially decrypts the encrypted association score using the ciphertext.

Optionally, the method 200 comprising the first data and the second data are encrypted using homomorphic encryption.

Optionally, the method 200 comprising the first data 114 and the second data 116 are encrypted using a first public key and a second public key respectively, wherein the requesting device 104 and the responding device 106 provide the first and second public keys to the server arrangement 102.

Optionally, the method 200 comprising the causality measure is based on an iterative process of conditional independence tests, wherein the conditional independence tests are indicative of whether a subset of the first data is conditionally independent of a subset of the second data, given another subset—the conditioning subset—of either the first data or the second data.

Optionally, the method 200 comprising the conditional independence tests are based on an independence test and at least one of: a regression method, a classification method.

Optionally, the method 200 comprising the regression method of the conditional independence test is based on at least one of: Linear Regression, Generalized Additive Models, Gaussian Processes, Artificial Neural Networks.

Optionally, the method 200 comprising the classification method of the conditional independence test is based on at least one of: Logistic Regression, Generalized Additive Models, Gaussian Processes, Artificial Neural Networks.

Optionally, the method 200 comprising the independence test is determined based on at least one of: Pearson Correlation, Spearman Correlation, Mutual Information, Distance Correlation, Hilbert-Schmidt Independence Criterion, kernel-based independence measures, rank-based independence measures, non-parametric independence measures.

Optionally, the method 200 comprising the conditional independence tests are based on at least one of: Partial Pearson correlation, Partial Spearman Correlation, Conditional Mutual Information, kernel-based conditional independence measures, non-parametric conditional independence measures.

Optionally, the method 200 comprising the causality measure is determined based on Granger Causality.

Optionally, the method 200 comprising wherein the encrypted association score is determined based on at least one of: Pearson Correlation, Spearman Correlation, Kendall Correlation, Mutual Information, Matthews correlation, ANOVA F-value and Point-Biserial correlation.

Optionally, the method 200 comprising the first data received from the requesting device may include a control data for the purpose of guarding against spurious correlations between the first data and the second data.

Optionally, the method 200 comprising the server arrangement 102 is further configured to receive second data from two or more responding devices to provide a cumulative second data, considered for determining the encrypted association score against the first data.

The present disclosure also provides a computer program product comprising a non-transitory computer-readable storage medium having computer program instructions stored thereon, the computer-readable instructions or the computer program code being executable by a computerized device comprising data processing hardware to execute the method 200 for executing a data access transaction. Typically, the method 200 is for a server arrangement 102 of the system 100 to execute a data access transaction. The computer program product can direct a computerized device, other programmable data processing apparatus, or other interacting computation devices to function in a particular manner, such that the instructions stored in the non-transitory computer-readable storage medium cause a series of steps to implement the function specified in a flowchart corresponding to the instructions. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Figure 3:
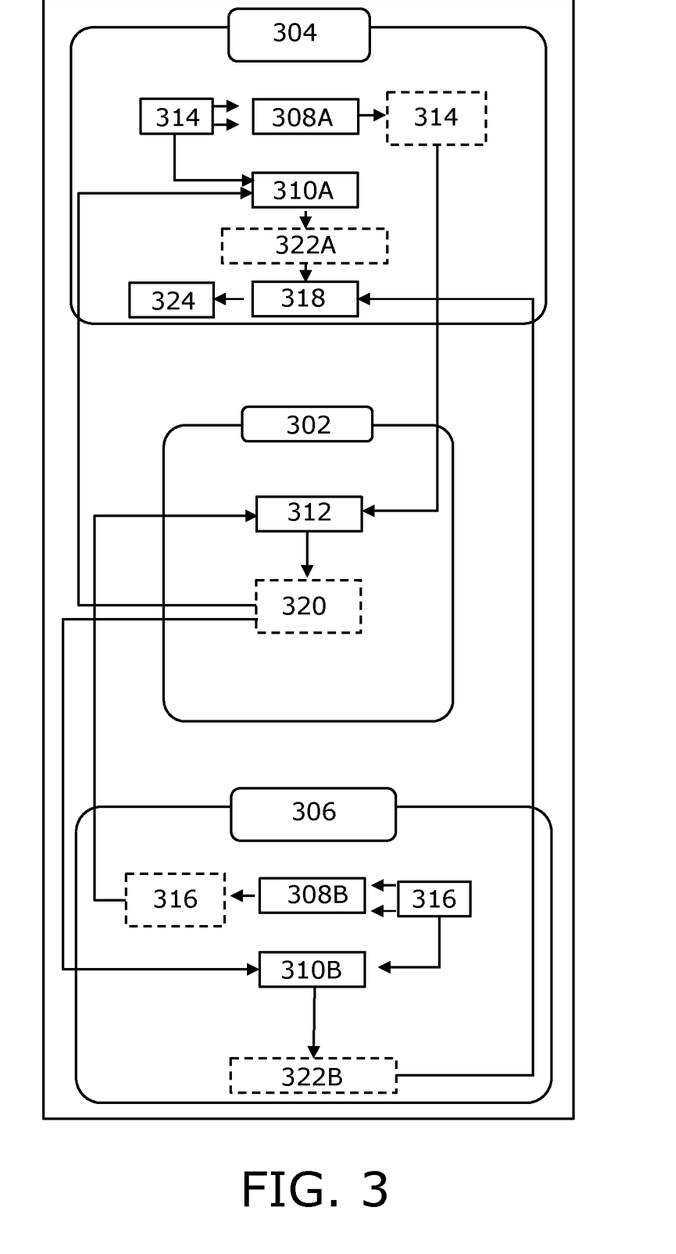
FIG. 3 illustrates a flowchart depicting a data sharing protocol of a system for executing a data access transaction, in accordance with an embodiment of the present disclosure.

Referring to FIG. 3, illustrated is a flowchart depicting a data sharing protocol of a system 300 (such as the system 100 of FIG. 1) for executing a data access transaction between the server arrangement 302 (such as the server arrangement 102 of FIG. 1), the requesting device 304 (such as the requesting device 104 of FIG. 1) and the responding device 306 (such as thee responding device 106 of FIG. 1). As shown, each of the interacting computation devices (i.e. the requesting device 304 and the responding device 306) comprises individual computational elements i.e. encryption modules (or an encryptor's) 308A, 308B and decryption modules (or a decryptor's) 310A, 310B for performing the data communication by encrypting the first data 314 (such as the first data 114 of FIG. 1) using encryption module 308A and the second data 316 (such as the second data 116 of FIG. 1) using the encryption module 308B before communication. Notably, an encrypted first data 314E and an encrypted second data 316E is obtained via the encryption of the first data 314 and the second data 316. Notably, all encrypted data (such as the encrypted first data 314E or encrypted association score) is represented as a dashed box. The server arrangement 302 comprises an evaluation module (or an evaluator) 312 for determining the encrypted association score 320. Further, each of the requesting device 304 and the responding device 306 has provided a vector for an association computation of the data (such as the encrypted first data 314E and the encrypted second data 316E) including the respective public keys (such as the first public key and the second public key) to the server arrangement 302. The server arrangement 302 upon receiving the respective vectors comprising the encrypted first data 314E, the first public key (not shown) from the requesting device 304 and the encrypted second data 316E, the second public key (not shown) from the responding device 306, determines or evaluates the encrypted association score 320 using the evaluation module 312. Notably, the evaluation module 312 includes an evaluator function configured to determine the association between the encrypted first data 314E and the encrypted second data 316E. Additionally, the choice of association measure being implemented to determine the encrypted association score 320 is dependent upon efficiency of implementation, resource availability and to a previously agreed standard. Further, upon determining the encrypted association score 320, the server arrangement 302 transmits the encrypted association score 320 to each of the requesting device 304 and the responding device 306. Furthermore, upon receiving the encrypted association score 320, each of the requesting device 304 and the responding device 306 performs a partial decryption of the encrypted association score 320 using the decryption modules 310A, 310B to obtain partial decryptions 322A and 322B from the requesting device 304 and the responding device 306 respectively. Specifically, the requesting device 304 employs the decryption module 310A and the responding device 306 employs the decryption module 310B. Furthermore, the responding device 306 upon performing the partial decryption transmits the partial decryption 322B of the encrypted association score 320 to the requesting device 304 via the server arrangement 302. Notably, the partial decryptions 322A, 322B of the encrypted association score 320 is also represented by a dashed box. Furthermore, the requesting device 304 upon receiving the partial decryption 322B of the encrypted association score 320 from the responding device 306, merges each of the partial decryptions 322A, 322B of the encrypted association score 320 using a merging module 318 and fully decrypts the encrypted association score by merging each of the partial decryptions 322A, 322B of the encrypted association score 320 to determine a merged association score 324. Moreover, the server arrangement 302 upon determining the merged association score 324 further determines, whether the second data 316 is useful or not based on the determined merged encrypted association score 324.

Throughout the present disclosure, the term "module or software module" refers to a software program comprising executable instructions to perform one or more distinctive data processing operations. In an example, the modules of the system 100 may include, but are not limited to, an encryption module (such as the encryption modules 308A, 308B), decryption module (such as the decryption module 310A, 310B), an evaluation module 312 and a merging module 318.

In an embodiment, all modules or software modules of the systems 100, 300 are implemented as separate software modules. In another embodiment, two or more software modules of systems 100, 300 are implemented as an integrated software module.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for executing a data access transaction, the system comprising a server arrangement, the server arrangement being communicably coupled with at least one requesting device and at least one responding device, wherein the server arrangement is configured to:
   receive from a requesting device and a responding device, a first data and a second data respectively, wherein the first data and the second data are encrypted and temporally defined;
   receive from the requesting device a metadata of the first data, wherein the metadata is encrypted by the requesting device;
   determine, via a microprocessor, an encrypted association score by comparing the first data and the second data, wherein the encrypted association score is based on a temporally defined dynamic evaluation component, wherein the temporally defined dynamic evaluation component includes a causality measure, wherein the causality measure is able to identify and exclude spurious correlations between the first data and the second data, wherein the causality measure is based on an iterative process of conditional independence tests, wherein the conditional independence tests are indicative of whether a subset of the first data is conditionally independent on a subset of the second data, given another conditioning subset of either the first data or the second data;
   provide, via the microprocessor, the encrypted association score to the requesting device and the responding device, wherein each of the requesting device and the responding device partially decrypt the encrypted association score;
   obtain the partial decryption of the encrypted association score from the responding device and provide, via the microprocessor, the partial decryption to the requesting device, wherein the requesting device fully decrypts the encrypted association score using the partial decryption obtained from the responding device; and
   enable the requesting device to access the second data from the responding device based on the fully decrypted association score, upon receiving a request for the access to the second data.

2. A system of claim 1, wherein the metadata of the first data includes at least one of:
   time range, date range, prediction horizon, time resolution, background tag, technical tag, type of association measure.

3. A system of claim 1, wherein the server arrangement is further configured to provide a ciphertext to the responding device, wherein the responding device partially decrypts the encrypted association score using the ciphertext.

4. A system of claim 1, wherein the first data and the second data are encrypted using homomorphic encryption.

5. A system of claim 1, wherein the first data and the second data are encrypted using a first public key and a second public key respectively, wherein the requesting device and the responding device provide the first and second public keys to the server arrangement.

6. A system of claim 1, wherein the independence test is determined based on at least one of: Pearson Correlation, Spearman Correlation, Mutual Information, Distance Correlation, Hilbert-Schmidt Independence Criterion, kernel-based independence measures, rank-based independence measures non-parametric independence measures.

7. A system of claim 1, wherein the causality measure is determined based on Granger Causality.

8. A system of claim 1, wherein the first data received from the requesting device may include a control data for the purpose of guarding against spurious correlations between the first data and the second data.

9. A system of claim 1, wherein the server arrangement is further configured to receive second data from two or more responding devices to provide a cumulative second data, considered for determining the encrypted association score against the first data.

10. A method for executing a data access transaction, the method being implemented by a system comprising a server arrangement, the server arrangement being communicably coupled with at least one requesting device and at least one responding device, wherein the method comprises:
    receiving from a requesting device and a responding device, a first data and a second data respectively, wherein the first data and the second data are encrypted and temporally defined;
    receiving from the requesting device a metadata of the first data, wherein the metadata is encrypted by the requesting device;
    determining an encrypted association score by comparing the first data and the second data, wherein the encrypted association score is based on a temporally defined dynamic evaluation component, wherein the temporally defined dynamic evaluation component includes a causality measure, wherein the causality measure is able to identify and exclude spurious correlations between the first data and the second data, wherein the causality measure is based on an iterative process of conditional independence tests, wherein the conditional independence tests are indicative of whether a subset of the first data is conditionally independent on a subset of the second data, given another conditioning subset of either the first data or the second data;

providing the encrypted association score to the requesting device and the responding device, wherein each of the requesting device and the responding device partially decrypt the encrypted association score;

obtaining the partial decryption of the encrypted association score from the responding device and provide the partial decryption to the requesting device, wherein the requesting device fully decrypts the encrypted association score using the partial decryption obtained from the responding device; and enabling the requesting device to access the second data from the responding device based on the fully decrypted association score, upon receiving a request for the access to the second data.

11. A method of claim 10, wherein the metadata of the first data includes at least one of: time range, date range, prediction horizon, time resolution, background tag, technical tag, type of association measure.

12. A method of claim 10, wherein the method comprises providing a ciphertext to the responding device, wherein the responding device partially decrypts the encrypted association score using the ciphertext.

13. A method of claim 10, wherein the first data and the second data are encrypted using homomorphic encryption.

14. A method of claim 10, wherein the first data and the second data are encrypted using a first public key and a second public key respectively, wherein the requesting device and the responding device provide the first and second public keys to the server arrangement.

15. A method of claim 10, wherein the independence test is determined based on at least one of: Pearson Correlation, Spearman Correlation, Mutual Information, Distance Correlation, Hilbert-Schmidt Independence Criterion, kernel-based independence measures, rank-based independence measures, non-parametric independence measures.

16. A method of claim 10, wherein the causality measure is determined based on Granger Causality.

17. A method of claim 10, wherein the first data received from the requesting device may include a control data for the purpose of guarding against spurious correlations between the first data and the second data.

18. A method of claim 10, wherein the server arrangement is further configured to receive second data from two or more responding devices to provide a cumulative second data, considered for determining the encrypted association score against the first data.

19. A computer program product comprising a non-transitory computer-readable storage medium having computer-readable instructions stored thereon, the computer-readable instructions being executable by a computerized device comprising data processing hardware to execute a method for executing a data access transaction, the method being implemented by a system comprising a server arrangement, the server arrangement being communicably coupled with at least one requesting device and at least one responding device, wherein the method comprises:

receiving from a requesting device and a responding device, a first data and a second data respectively, wherein the first data and the second data are encrypted and temporally defined;

receiving from the requesting device a metadata of the first data, wherein the metadata is encrypted by the requesting device;

determining an encrypted association score by comparing the first data and the second data, wherein the encrypted association score is based on a temporally defined dynamic evaluation component, wherein the temporally defined dynamic evaluation component includes a causality measure, wherein the causality measure is able to identify and exclude spurious correlations between the first data and the second data, wherein the causality measure is based on an iterative process of conditional independence tests, wherein the conditional independence tests are indicative of whether a subset of the first data is conditionally independent on a subset of the second data, given another conditioning subset of either the first data or the second data;

providing the encrypted association score to the requesting device and the responding device, wherein each of the requesting device and the responding device partially decrypt the encrypted association score;

obtaining the partial decryption of the encrypted association score from the responding device and provide the partial decryption to the requesting device, wherein the requesting device fully decrypts the encrypted association score using the partial decryption obtained from the responding device; and enabling the requesting device to access the second data from the responding device based on the fully decrypted association score, upon receiving a request for the access to the second data.

* * * * *